July 15, 1941.  E. E. ROSAIRE  2,249,328
CALIBRATION MEANS
Filed Aug. 25, 1938

Inventor
E. E. ROSAIRE
Jesse R. Stone
Lester B Clark
By
Attorneys

Patented July 15, 1941

2,249,328

UNITED STATES PATENT OFFICE 2,249,328

CALIBRATION MEANS

Esme E. Rosaire, Houston, Tex.

Application August 25, 1938, Serial No. 226,761

1 Claim. (Cl. 175—182)

This invention pertains to the field of geophysical prospecting by electrical methods and relates specifically to maintenance and calibration of instruments used to measure waveform changes in the detected electric potentials.

The art to which this invention applies comprehends means and method of passing current impulses or an alternating current into the earth and detecting potential between points within the area subjected to such current, observations being made of departure of the waveform from normal as an indication of anomalous conditions in the strata through which the current has passed. The invention pertains to and supplements that of West et al. as disclosed in application Serial No. 226,668 filed of even date herewith.

An object of the invention is to provide calibration means whereby a geo-electric exploration instrument may be maintained to uniform standards.

An object is to detect changes in geo-electric measuring equipment due to aging, shock, battery changes, etc., whereby adjustments may be made to cause the performance to conform to a given standard.

These objects together with other and further objects will be apparent from the following description taken in connection with the drawing in which.

A recently developed art in geophysical prospecting is that employing electric transients. Either a single impulse or succession of square current impulses are caused to flow in the earth, and at some distance away the characteristics of the waveform of the potential so produced is observed. The delay in reaching steady state, or the fraction of steady state reached in a specified time, or some other characteristic of the detected wave shape is used as the criterion to determine changes in geologic structure. In one method, the characteristic observed is the time constant of the wave, and that is determined by opposing the detected wave with a synthetic wave, varying the shape of the synthetic wave until a null is observed, and noting the time constant of the circuit used to produce the synthetic wave. This is a number read off the dial by means of which a circuit parameter is adjusted. In other methods, arbitrary dial units are used. In still others, an oscillogram of the detected potential is measured directly. In any of these methods, amplifiers, oscillographs, synthetic wave generators and/or other apparatus may vary in gain and frequency characteristics so that the measured values of amplitude and waveform may appear and change.

However, by generating waves of known characteristics such as known amplitudes and time constants of one or more components, an indicator may be initially adjusted and then maintained to that same adjustment over a long period of time, several indicators may be adjusted to be identical, and each may be adjusted over a wide range of possible time constants, amplitudes and/or other characteristics.

Figure 2:
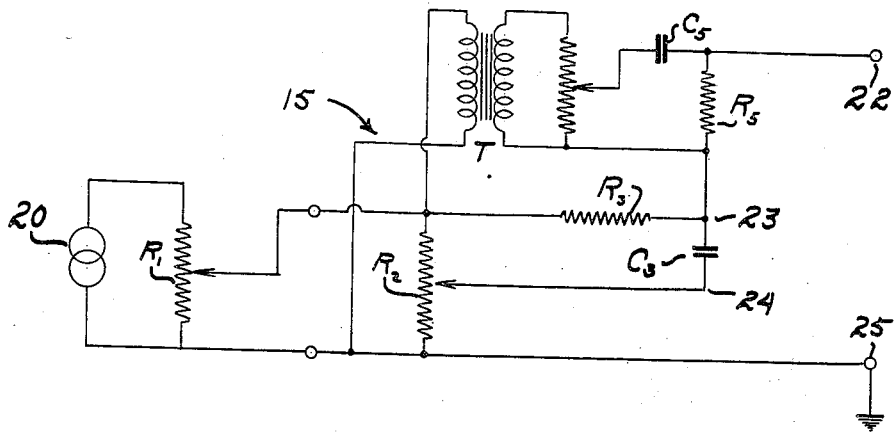
Fig. 2 is a circuit diagram illustrating a network comprising an important feature of the invention.
Figure 1:
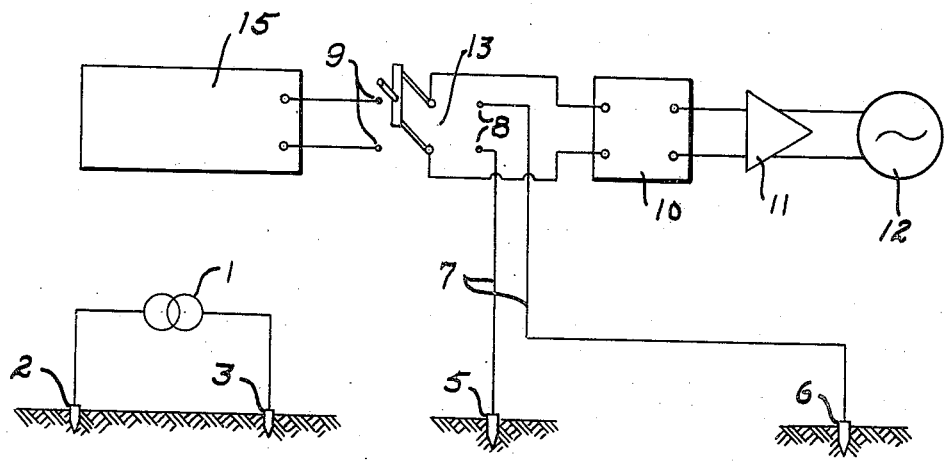
Fig. 1 is a block diagram illustrating the invention.

In Fig. 1 there is shown a general plan of geoelectric exploration equipment embodying the invention. An electric generator 1 of suitable waveform causes current to flow through the earth between electrodes 2 and 3. Spaced from the region of generation of the earth current arc detector electrodes 5 and 6 from which a detected potential resulting from the earth current is carried through conductors 7 to the terminals 8 of a double-pole double-throw switch 13. When this switch 13 is thrown to the right, as shown in Fig. 1, the potential between electrodes 5 and 6 is impressed upon a network 10 which may take on various forms as brought out in the above mentioned application.

The particular network 10 utilized is relatively unimportant so far as the present invention is concerned. Such network together with an amplifier 11 and an indicator 12 form an assembly by means of which observation of the characteristics of the potential between electrodes 5 and 6 may be observed. Since, however, such assembly includes elements which are subject to change due to aging, shock and other factors, it is desirable to provide means whereby the equipment may be carefully calibrated.

Desired calibration is through the provision of a calibrating network generally indicated as 15 in Fig. 1 and which will be more fully described. This calibrating network is connected to the terminals 9 of the double-pole double-throw switch 13 and it is apparent that by throwing this switch to the left (Fig. 1) the calibrating network replaces the detecting circuit and permits calibration in a manner that will now be described.

The calibrating network 15 comprises an electric generator 20, having a potential divider R₁ connected across its terminals to serve as a volume control. The generator 20 is preferably one which will produce a rectangular wave, since the unit function or rectangular wave is generally used in the transient method of geophysical prospecting, although any suitable waveform may be used.

The potential divider $R_2$ divides the voltage into two parts one of which appears unmodified between point 24 and terminal 25. The other part is modified by the time constant circuit consisting of resistor $R_3$ and capacitor $C_3$, and the waveform across points 23 and 24 is a rising exponential having the time constant $R_3 \cdot C_3$.

A decaying transient whose time constant is $R_5 \cdot C_5$ may be added to the output potential in an amount determinable by adjustment of the potential divider $R_4$.

In order that the transformer T does not modify the performance of the $R_5C_5$ circuit, it is necessary that its leakage inductance $L_x$ be small so that $$\frac{L_x}{R_4} \ll R_5 \cdot C_5$$

and its shunt inductance $L_p$ be large so that $$\frac{L_p}{R_4} \ll R_5 \cdot C_5$$

For purpose of definition a time constant circuit is defined as one having an exponential decay characteristic. According to the following equations, (1) is herein referred to as a negative time constant and is produced by the circuit $R_3 \cdot C_3$ and (2) is called a positive time constant and is produced by circuit $R_5 \cdot C_5$ called a positive time constant circuit.

$$E = E_0(1 - \epsilon^{-\alpha t}) \quad (1)$$
$$E = E_0 \epsilon^{-\alpha t} \quad (2)$$

where $\alpha$ is the reciprocal of the time constant, such as $$1/\alpha_3 = R_3 \cdot C_3 \quad (3)$$
$$1/\alpha_5 = R_5 \cdot C_5 \quad (4)$$

In the design of such a network as herein described, it is preferable that $R_2$ and $R_4$ be small compared to $R_3$ and $R_5$. The time constants may be varied by varying either the resistors $R_3$ and $R_5$ or the capacitors $C_3$ and $C_5$.

The invention claimed is:

In a geo-electric prospecting system a generator adapted to cause electrical impulses to flow in the earth, a pair of spaced electrodes adapted to pick up voltages due to said impulses, an indicator electrically connected with said electrodes capable of exhibiting the wave shape of the potentials due to said impulses, and an electrical network capable of producing, by a predetermined setting of adjustable variables therein, a predetermined wave form typical of those received by the electrodes, and means for connecting said network to said indicator alternatively with said electrodes.

ESME E. ROSAIRE.